Patented Feb. 6, 1951

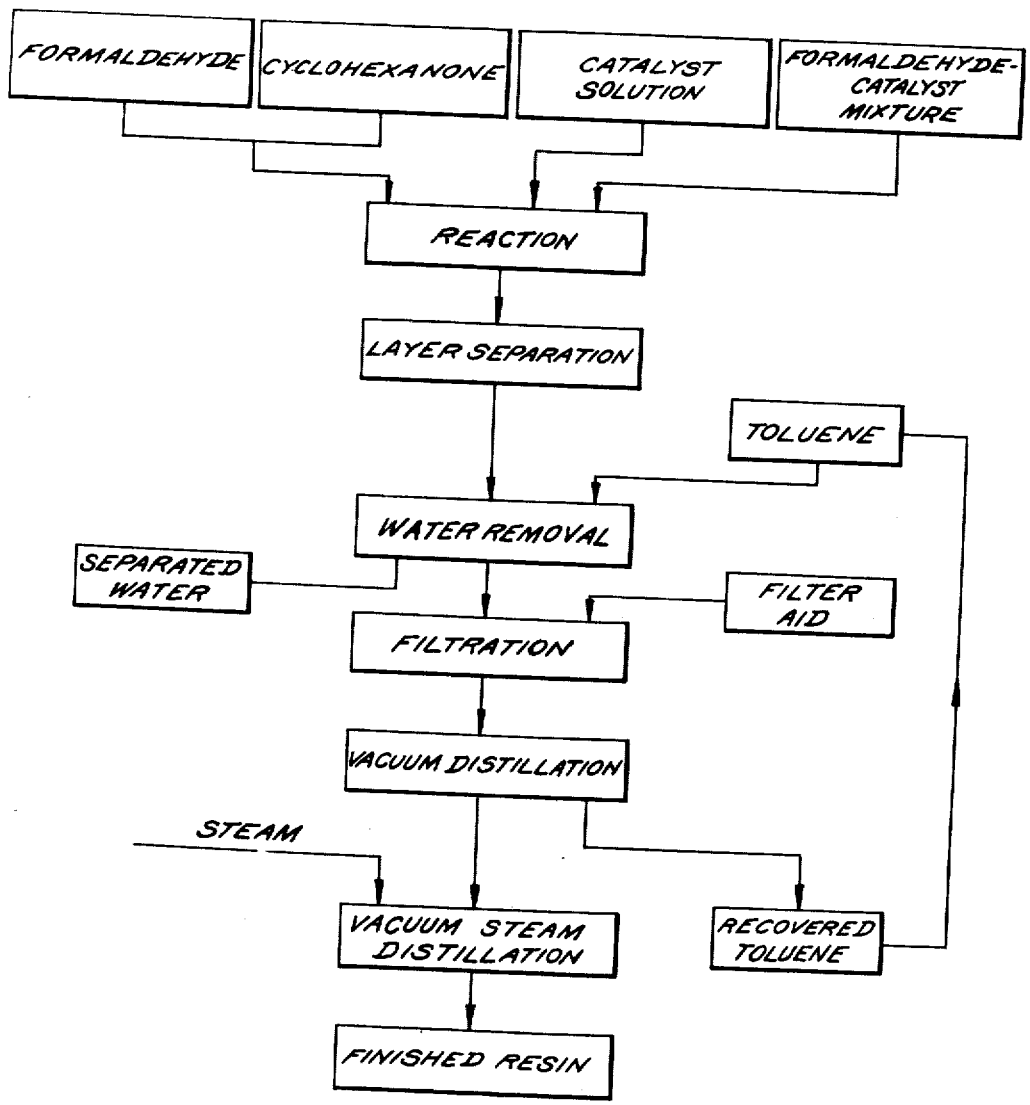

2,540,886

UNITED STATES PATENT OFFICE 2,540,886

CYCLOHEXANONE-FORMALDEHYDE RESIN PRODUCTION

Dee Alton Hurst, Haddonfield, and William J. Miller, Jr., Matawan, N. J., assignors to Allied Chemical & Dye Corporation, New York, N. Y., a corporation of New York Application May 16, 1947, Serial No. 748,576

12 Claims. (Cl. 260—64)

This invention relates to resins and more particularly to an improved process for the production of resins from cyclohexanones and formaldehyde.

Cyclohexanone-formaldehyde resins possess various properties such as good color stability and compatibility with cellulose esters which render them particularly well suited for use in coating compositions containing cellulose esters, e. g., nitrocellulose lacquers and varnishes, and for other purposes. Heretofore, it has been proposed to manufacture the resins by reacting the cyclohexanone and formaldehyde in the presence of catalysts such as caustic alkali. The resin made by the prior art processes, however, are subject to the disadvantages that they are of yellow or dark color and frequently cloudy to an objectionable degree. These characteristics are recognized in the literature. For example, the work entitled "Synthetic Resins and Allied Plastics," by Barry et al., published 1937 by D. Van Nostrand Company, Inc., points out (page 385) that cyclohexanone-formaldehyde resins are "generally of a pale lemon color." These disadvantages seriously limit use of the resins, particularly in clear, light colored coating compositions. Furthermore, difficulty is encountered in carrying out the prior art processes to obtain high yields of readily reproducible resins of uniform properties.

It is an object of the invention to provide a novel process for the production of high yields of readily reproducible clear resins of lighter color than were heretofore obtainable by reaction of formaldehyde with cyclohexanone and its 3-methyl and 4-methyl homologs.

It is another object of the invention to provide an improved process for the recovery of cyclohexanone-formaldehyde resins of high clarity from reaction mixtures containing the resins. Other objects and advantages will appear hereinafter.

In accordance with the invention, cyclohexanone- and methylcyclohexanone-formaldehyde resins are produced by reacting cyclohexanone or a 3-methyl or 4-methyl homolog thereof with formaldehyde in a molar ratio of from 1:1.35 to 1:1.65 in the presence of from .25 to 1 per cent of caustic alkali catalyst based on the weight of the cyclohexanone by the following procedure: (1) gradually and substantially continuously adding at least 50 per cent of the formaldehyde and 50 per cent of the catalyst, by weight, simultaneously to the cyclohexanone or homolog thereof, (2) maintaining the pH value of the mixture within the range of 8 to 9 during at least the initial major portion of the reaction, (3) raising the temperature of the reaction mixture while adding the catalyst and formaldehyde from within the range of 50° to 70° C., to within the range of 95° to 100° C. and maintaining the temperature within the latter range until the reaction is substantially complete, and (4) controlling the hydrogen ion concentration of the reaction mixture so that its pH value is within the range of 6.5 to 7.5 before recovery of resin from the mixture. The invention also comprehends an improved method of recovering clear light colored resin from the reaction mixture involving dissolving the resin in a hydrocarbon solvent, substantially freeing the solution from water and the alkali metal formate formed during the reaction, and distilling off the hydrocarbon solvent from the resin; the cyclohexanone- or methylcyclohexanone-formaldehyde resinous residue may subsequently be hardened by steam distillation under vacuum at a temperature not above 140° C.

By observing the above conditions, high yields of cyclohexanone- and methylcyclohexanone-formaldehyde resins of high clarity and color stability are obtained. The resins are of lighter color than were obtainable from the same reactants by processes heretofore known.

The accompanying drawing is a flow sheet illustrating one sequence of steps that may be employed in carrying out the invention.

The cyclohexanones may be utilized either in substantially pure form or in admixture with the corresponding cyclohexanols. Since use of mixtures containing more than 20 per cent of the cyclohexanols based on the weight of the mixture result in lower yields of resin than cyclohexanones of higher purity, preferably cyclohexanones of from 80 to 100 per cent purity containing not more than 20 per cent of cyclohexanols are employed.

As the formaldehyde reactant, aqueous formaldehyde is employed, conventional commercial 37% formaldehyde solutions (which ordinarily contain, e. g. 5–15%, of methanol) being suitable. The concentration of formaldehyde solution may be varied to any desired extent.

In order to carry out the reaction at a satisfactory rate while avoiding formation of emulsions which would detrimentally affect the recovery and clarity of the resin and also avoid objectionable darkening of the resin, it is important that the pH value of the reaction mixture be maintained about 8 during the initial major portion of the reaction period and be reduced to about the neutral point before recovery of the resin from the mixture. Among the more important factors affecting the pH value of the reaction mixture are the amount of catalyst employed, the molar ratio of formaldehyde to the cyclohexanone, the reactivity of the formaldehyde, the manner in which the reactants are brought together, the temperature at which the reaction is carried out, and the extent to which the catalyst formic acid react to form alkali metal formate, the formic acid being formed from formaldehyde by the Cannizzaro reaction.

As the catalyst, caustic alkali such as sodium hydroxide or potassium hydroxide is employed. The catalyst may conveniently be utilized as solutions of from 10 to 50 per cent caustic alkali concentration by weight in solvents such as water. As hereinabove discussed the amount of catalyst should be within the range of .25 to 1 per cent, preferably 0.6 to 0.8 per cent based on the weight of the cyclohexanone. Use of amounts of catalysts near the lower portion of this range, e. g. .25 to .36 per cent, tends to produce softer resins than are obtained when larger amounts of catalysts, e. g. .6 to .8 per cent, are employed. Use of less than .25 per cent of catalyst seriously reduces the resin yield while use of more than 1 per cent of catalyst results in resins of objectionably dark color.

The molar ratio of formaldehyde to cyclohexanone should be maintained within the range of from 1.35:1 to 1.65:1; preferably this molar ratio is varied, depending on the cyclohexanol content of the cyclohexanone, preferably from about 1.4:1 for mixtures containing about 80 per cent of cyclohexanone and 20 per cent of cyclohexanol to about 1.6:1 for substantially pure cyclohexanone. Smaller molar ratios of formaldehyde to cyclohexanone may be utilized but in this case a sufficient amount of an acidic reagent such as acetic acid, formic acid and orthophosphoric acid should be added to the reaction mixture at or near the end of the reaction to reduce the pH value of the mixture to substantially the neutral point.

The reactants are mixed by gradually and continuously adding a mixture of at least 50 per cent of the catalyst with at least 50 per cent of the formaldehyde to the cyclohexanone while agitating the latter. If desired, a mixture of all of the catalyst and all of the formaldehyde may be gradually added to the cyclohexanone. Preferably the reactants are brought together by first mixing not more than 50 per cent, ordinarily from 10 to 20 per cent, of the formaldehyde with the cyclohexanone, heating the mixture from 60° to 70° C., gradually adding sufficient catalyst to raise the pH value of the mixture to within the range of 8 to 9, e. g. 5 to 10 per cent but not more than 50% of the catalyst, while agitating the mixture and then gradually and continuously adding to the resultant mixture a mixture of the remainder of the formaldehyde and catalyst. The temperature of the cyclohexanone when the addition of catalyst is begun may be varied depending on the reactivity of the formaldehyde. Thus, for example, a cyclohexanone temperature of about 60° C. may advantageously be employed when formaldehyde of high reactivity is employed, while if formaldehyde of low reactivity is employed, the cyclohexanone may advantageously be at a temperature of about 70° C.

The addition of the catalyst and formaldehyde to the cyclohexanone is regulated so the temperature of the reaction mixture rises by the heat of the exothermic reaction from within the range of 50° to 70° C. (preferably this temperature range is 60° to 70° C.) to about 95° to 100° C. and after the reaction becomes less vigorous the temperature is maintained within the latter range until the reaction is substantially complete. By observing the preferred conditions, the pH value of the reaction mixture is gradually reduced from within the range of about 8 to 9 to within the range of 6.5 to 7.5, i. e. about the neutral point when the reaction is complete. If for any reason, e. g. use of a molar ratio of formaldehyde to cyclohexanone of less than 1.4:1, the pH value of the reaction mixture is substantially above 7 at the end of the reaction period, it may then be lowered to about the neutral point by addition of sufficient acidic reagent to accomplish the desired result. As the acidic reagent either organic or mineral acids, for example, acetic acid, formic acid, or orthophosphoric acid, may be employed.

When the reaction is complete, the reaction mixture is ordinarily constituted principally of the resinous reaction product, water, alkali metal formate, the alcohol formed by the Cannizzaro reaction and present as a constituent of the formaldeyhde use, some unreacted cyclohexanone and also some cyclohexanol if the cyclohexanol content of the cyclohexanone employed is substantial. Recovery of the resin by merely distilling off the volatile constituents of the reaction mixtures results in cloudy resinous products of objectionably dark color, particularly if distillation temperatures above 140° C. are employed. The lack of clarity of the resin is attributable to the presence of alkali metal formate formed by the reaction of the catalyst with the formic acid during the reaction. I have discovered that by dissolving the resin of the reaction mixture having a pH value of from 6.5 to 7.5 in sufficient hydrocarbon solvent such as toluene to reduce its viscosity materially and separating the alkali metal formate from the resin solution, clear resin substantially free from alkali metal formate may subsequently be recovered readily from the resin solution by distillation. Separation of the formate from the resin solution may be accomplished either by washing the solution with water or by filtration. The major portion of the aqueous constituent of the reaction mixture may be separated from the resin either before or after addition of the hydrocarbon solvent to the resin. A preferred procedure for recovery of the resin from the reaction mixture involves the following steps: (1) removing the aqueous layer, e. g. by decantation or siphoning, from the resin at a temperature between 25° and 80° C., (2) dissolving the resin containing residual water in sufficient hydrocarbon solvent such as toluol to give a resin solution of 50 to 60 per cent resin content by weight, (3) removing the residual water from the resin solution by centrifuging or by settling the solution while slowly agitating it, (4) filtering the resin solution, and (5) distilling the filtered hydrocarbon solution of resin under vacuum at a temperature not above 135° C., until the solvent is removed leaving the resin as residue. The residual unreacted materials may be subsequently removed by steam distillation under vacuum at a temperature not above 140° C. If the water is removed substantially completely from the resin in step (3), the filtration step may be omitted. The filtration step is advantageously conducted without sucking the filter dry in the presence of a filter aid which envelops suspended small solid particles and prevents them from passing through the filter; acid-treated and calcined diatomaceous silicas and clays from which no color may be leached may be employed as filter aids. The hydrocarbon solvent employed in recovery of the resin from the reaction mixture should boil within the range of from 80° to 140° C., preferably below 130° C., and may be of aromatic or non-aromatic character. Examples of such hydrocarbons are toluene and benzene.

The following examples are further illustrative of the invention:

Example 1

The materials used were 1010 parts by weight of cyclohexanone-cyclohexanol mixture containing about 80 per cent of cyclohexanone and 20 per cent of cyclohexanol by weight, sufficient aqueous formaldehyde solution containing 37 per cent by weight of formaldehyde to provide a molar ratio of formaldehyde to provide a molar ratio of formaldeyhe to the cyclohexanone content of the cyclohexanone-cyclohexanol mixture of 1.4:1 and sufficient 20 per cent solution of sodium hydroxide catalyst to provide 0.8 per cent of the hydroxide based on the weight of the cyclohexanone. 25 per cent of the formaldehyde was added to the cyclohexanone-cyclohexanol mixture and the mixture was heated to about 50° C. About 9 per cent of the catalyst solution was then added gradually over a period of about 3 minutes while agitating the mixture; during this period the temperature of the mixture rose to about 80° C. under the influence of the heat liberated by the exothermic reaction. The remainder of the catalyst was then mixed with the remainder of the formaldehyde and this mixture was gradually and continuously added to the reaction mixture while agitating over a period of about 5 minutes. The temperature of the reaction mixture was raised during this period to about 96° C. by the heat of the exothermic reaction. After the addition of all the formaldehyde and catalyst the reaction mixture was refluxed at a temperature of about 95° C. for 65 minutes until the reaction was substantially complete. The reaction mixture had a pH value of 7.43. After the reaction was complete the aqueous methanol layer was separated from the resinous layer by decantation at a temperature of about 80° C. The resinous solution was distilled under final vacuum of about 28 inches of mercury leaving the resin as still residue. The resinous residue was then steam distilled under vacuum of 2 inches of mercury at a temperature of about 135° C. for about 75 minutes. 1150 parts by weight of resin of a melting point of 90° C. were obtained; the resin was substantially colorless. The resin yield was about 1.14 parts by weight for each part by weight of cyclohexanone utilized.

Example 2

The materials used were 1000 grams of a mixture of 3-methyl- and 4-methylcyclohexanones, sufficient aqueous formaldehyde solution containing 37 per cent by weight of formaldehyde to provide a molar ratio of formaldehyde to the methylcyclohexanones of 1.6:1, and sufficient 20 per cent solution of sodium hydroxide catalyst in water to provide .6 per cent of the hydroxide based on the weight of the methylcyclohexanones. 20 per cent of the formaldehyde was added to the methylcyclohexanone mixture. The mixture was heated to a temperature of about 50° C. and 3 ml. of the catalyst solution were added to the mixture over a period of about 3 minutes. The mixture was heated to 90° C. and the flame removed. Thereafter, a mixture of the remaining catalyst and the remaining formaldehyde was gradually and continuously added to the reaction mixture while agitating over a period of about 72 minutes. The temperature of the reaction mixture was raised during this period to about 96° C. by the heat of the exothermic reaction. When the reaction was complete, the pH value of the reaction mixture was about 7.5. The aqueous layer was decanted and the resin was washed once with cold water, was then vacuum distilled for ¾ hour, followed by vacuum steam distillation for one hour at 110°–115° C. and ¼ hour at 115°–125° C. About 1110 parts of nearly colorless resin of melting point of about 78° C. were obtained.

Example 3

This example differed from Example 1 chiefly in that substantially pure cyclohexanone was utilized, sufficient formaldehyde was employed to provide a molar ratio of formaldehyde to cyclohexanone of 1.6:1, and all of the catalyst was mixed with the formaldehyde and the mixture was added gradually and continuously to the cyclohexanone at a temperature of about 95° C. over a period of about 8 minutes. At the end of the reaction, the pH value of the reaction mixture was 7.17. The aqueous layer was decanted from the resin and the resin was poured in a thin stream into hot tap water. The aqueous layer was decanted again after the resin had settled, and recovery of the resin was completed by vacuum distillation for ¾ hour to 85° C., followed by vacuum steam distillation for 35 minutes to 116° C. About 1200 parts of a nearly colorless resinous product of melting point of about 87° C. were obtain.

Example 4

The materials used were 1010 grams of cyclohexanone of 97% purity, 1300 grams 37% formaldehyde solution, and 31 milliliters of 20% sodium hydroxide solution. The cyclohexanone was heated to 75° C. and 300 grams of the formaldehyde that had been neutralized with one milliliter of normal sodium hydroxide solution was added to the cyclohexanone. The temperature of the mixture dropped and heating was continued until the mixture again reached a temperature of 75° C. The heating was then discontinued and the remainder of the formaldehyde solution containing the 31 milliliters of 20% NaOH was added slowly over a period of 11 minutes. The mixture was agitated and heated to reflux for 30 minutes calculated from the start of the second addition of formaldehyde. Thereafter the aqueous methanol layer was separated by decantation from the resin layer. The separated resin layer was then dissolved in 2 liters of toluol, the resultant solution allowed to settle, and the resin solution was separated from residual water. The resin solution was then filtered and after standing overnight was vacuum distilled until 1266 grams of crystal-clear resin of melting point of 79° C. was obtained as residue.

The resin melting points given herein are determined by the cube-in-mercury described in "Protective and Decorative Coatings," vol. 1, copyright 1941 by J. J. Matiel'o, pages 366–67, published by John A. Wiley & Sons, Inc., New York New York.

What is claimed is:

1. A process of producing resins comprising reacting formaldehyde with cyclohexanones of the group consisting of cyclohexanone and its 3-methyl and 4-methyl homologs in a molar ratio of from 1.35 to 1.65 mols of formaldehyde in aqueous solution to each mol of the cyclohexanone in the presence of from .25 to 1 per cent of caustic alkali catalyst based on the weight of the cyclohexanone, gradually and substantially continuously adding at least 50 per cent of the catalyst and 50 per cent of the formaldehyde simultaneously to the cyclohexanone, in a manner such that the simultaneous addition of at least about the said proportions of formaldehyde and catalyst is the final addition of reactants to the reaction mixture raising the temperature of the reaction mixture from within the range of 50° to 70° C. to within the range of 95° to 100° C. during the reaction and controlling the pH value of the reaction mixture so that it is within the range of 8 to 9 during the initial major portion of the reaction and within the range of 6.5 to 7.5 before recovery of the resin from the reaction mixture and mechanically separating the aqueous layer.

2. In a process of reacting formaldehyde with cyclohexanones of the group consisting of cyclohexanone and its 3-methyl and 4-methyl homologs to form resinous products, the improvement which comprises utilizing a molar ratio of formaldehyde to cyclohexanone falling within the range of 1.35:1 to 1.65:1 the formaldehyde being in aqueous solution and from .25 to 1 per cent of caustic alkali catalyst based on the weight of the cyclohexanone, gradually and continuously adding at least 50 per cent of the formaldehyde and 50 per cent of the catalyst simultaneously to the cyclohexanone, in a manner such that the simultaneous addition of at least about the said proportions of formaldehyde and catalyst is the final addition of reactants to the reaction mixture raising the temperature of the reaction mixture from within the range of 50° to 70° C. to within the range of 95° to 100° C. during the reaction and controlling the pH value of the reaction mixture so that it falls from within the range of 8 to 9 to within the range of 6.5 to 7.5 when said reaction is complete mechanically separating the aqueous layer, and recovering resin substantially free from alkali metal formate from said reaction mixture.

3. A process of producing resins by reacting aqueous formaldehyde with cyclohexanones of the group consisting of cyclohexanone and its 3-methyl and 4-methyl homologs in a molar ratio of from 1.35 to 1.65 mols of the formaldehyde to each mol of the cyclohexanone in the presence of from .25 to 1 per cent of caustic alkali catalyst based on the weight of the cyclohexanone, which comprises mixing a portion but not more than 50 per cent of the formaldehyde with the cyclohexanone at a temperature within the range of 50° to 70° C., adding to said mixture sufficient catalyst to raise the pH value of the mixture to between 8 and 9, but not more than 25 per cent of the catalyst utilized, gradually and continuously adding to the resultant mixture a mixture of the remainder of the formaldehyde and catalyst, regulating the addition of the formaldehyde and catalyst so that the temperature of the reaction mixture rises to within the range of 95° to 100° C., and controlling the pH value of the reaction mixture so that it is within the range of 8 to 9 during the initial major portion of the reaction period, and falls to within the range of 6.5 to 7.5 when said reaction is complete, mechanically separating the aqueous layer and recovering resin substantially free from alkali metal formate from said reaction mixture.

4. A process of producing resins by reacting aqueous formaldehyde with cyclohexanones of the group consisting of cyclohexanone and its 3-methyl and 4-methyl homologs in a molar ratio of from 1.35 to 1.65 mols of formaldehyde to each mol of the cyclohexanone in the presence of from .25 to 1 per cent of caustic alkali catalyst based on the weight of the cyclohexanone, which comprises forming a heated mixture of the cyclohexanone with a portion but not more than 50 per cent of the formaldehyde at a temperature within the range of 50° to 70° C., adding to the cyclohexanone-formaldehyde mixture sufficient catalyst to raise the pH value of the mixture to within the range of 8 to 9 but not more than 25 per cent of the catalyst, adding to the resultant mixture while agitating a mixture of the remainder of the formaldehyde and catalyst, regulating the addition of the formaldehyde and catalyst so the temperature of the reaction mixture is raised by the heat liberated by the reaction to within the range of 95° to 100° C., controlling the pH value of the reaction mixture so that it falls from within the range of 8 to 9 during the course of the reaction to within the range of 6.5 to 7.5 when the reaction is complete mechanically separating the aqueous layer and recovering resin substantially free from alkali metal formate from the reaction mixture.

5. A process of producing resins by reacting aqueous formaldehyde with mixtures of cyclohexanone and cyclohexanol containing up to 20 per cent of cyclohexanol based on the weight of the mixture in a molar ratio of from 1.35 to 1.65 mols of formaldehyde to each mol of the cyclohexanone in the presence of from .25 to 1 per cent of caustic alkali catalyst based on the weight of the cyclohexanone, which comprises forming a heated mixture of the cyclohexanone and cyclohexanol with not more than 50 per cent of formaldehyde at a temperature of from 50° to 70° C., adding to the resultant mixture sufficient catalyst to raise the pH value of the reaction mixture to within the range of 8 to 9 but not more than 25 per cent of the catalyst, gradually and continuously adding to this mixture while agitating a mixture of the remainder of the formaldehyde and catalyst, regulating the addition of the formaldehyde and catalyst so the temperature of the reaction mixture is raised by the heat liberated by the reaction to within the range of 95° to 100° C., maintaining the temperature within said last-named range until the reaction is substantially complete, controlling the pH value of the reaction mixture so that it falls to within the range of 6.5 to 7.5 when the reaction is complete mechanically separating the aqueous layer, and recovering resin substantially free from alkali metal formate from the said reaction mixture.

6. A process of producing resins by reacting aqueous formaldehyde with mixtures of 3- and 4-methylcyclohexanones and methylcyclohexanol containing up to 20 per cent of methylcyclohexanol based on the weight of the mixture in a molar ratio of from 1.4 to 1.6 mols of formaldehyde to each mol of the methylcyclohexanone in the presence of from .25 to 1 per cent of caustic alkali catalyst based on the weight of the methylcyclohexanones, forming a heated mixture of the methylcyclohexanone and methylcyclohexanol with from 0 to 50 per cent of the formaldehyde at a temperature of 50° to 70° C., adding to the resultant mixture from 0 to 25 per cent of the catalyst, gradually and substantially continuously adding to this mixture while agitating a mixture of the remainder of the formaldehyde and catalyst, regulating the addition of the formaldehyde and catalyst so the temperature of the reaction mixture is raised by the heat of the reaction to within the range of 95° to 100° C., maintaining the temperature within said last-named range until the reaction is substantially complete, controlling the pH value of the reaction mixture so that it falls from within the range of 8 to 9 during the course of the reaction to within the range of 6.5 to 7.5 when the reaction is complete mechanically separating the aqueous layer, and recovering resin substantially free from alkali metal formate from said reaction mixture.

7. In a process of recovering a clear resin selected from the group consisting of cyclohexanone-formaldehyde and 3- and 4-methylcyclohexanone-formaldehyde resins from reaction mixtures containing the resin, alkali metal formate, alcohol, and unreacted cyclohexanone and water, which reaction mixtures have a pH value within the range of 6.5 to 7.5 the steps, which comprise mechanically separating water from said reaction mixtures, dissolving the resin in a hydrocarbon solvent, filtering the resultant resin solutions to separate alkali metal formate crystals therefrom and distilling the filtered resin solution under vacuum at a temperature not above 140° C. to remove the solvent from the resin.

8. In a process of recovering a clear resin selected from the group consisting of cyclohexanone-formaldehyde and 3- and 4-methylcyclohexanone-formaldehyde resins from reaction mixtures containing the resin, alkali metal formate, alcohol and unreacted cyclohexanone and water, which reaction mixtures have a pH value falling within the range of 6.5 to 7.5 the steps, which comprise mechanically separating water from the reaction mixtures, dissolving the resin in a hydrocarbon solvent removing residual water, and distilling the resin solution under vacuum at a temperature not above 140° C. to remove the solvent from the resin.

9. A process of recovering clear cyclohexanone-formaldehyde resins from reaction mixtures containing the resins, alkali metal formate, alcohol, unreacted cyclohexanone and water, which reaction mixtures have a pH value falling within the range of 6.5 to 7.5, which comprises mechanically removing the major portion of the water from the reaction mixtures at a temperature between 20° and 80° C., dissolving the resin containing residual water in sufficient toluol to give a resin solution of 50 to 60 per cent resin content by weight, mechanically separating additional water from the resin solution, filtering the resin solution in the presence of a filter aid, distilling the resin solution under vacuum at a temperature not above 135° C. until the solvent is substantially removed, leaving the resin as residue, and steam distilling the resin under vacuum at a temperature below 140° C. to remove unreacted cyclohexanone therefrom without substantially darkening the resin.

10. A process of producing resins comprising reacting formaldehyde with cyclohexanones of the group consisting of cyclohexanone and its 3-methyl and 4-methyl homologs in a molar ratio of from 1.35 to 1.65 mols of formaldehyde in aqueous solution, to each mol of the cyclohexanone in the presence of from .25 to 1 percent of caustic alkali catalyst based on the weight of the cyclohexanone, gradually and substantially continuously adding at least 50 percent of the catalyst and 50 percent of the formaldehyde simultaneously to the cyclohexanone, in a manner such that the simultaneous addition of at least about the said proportions of formaldehyde and catalyst is the final addition of reactants to the reaction mixture raising the temperature of the reaction mixture from within the range of 50° C. to 70° C. to within the range of 95° C. to 100° C. during the reaction, and controlling the pH value of the reaction mixture so that it is within the range of 8 to 9 during the initial major portion of the reaction and within the range of 6.5 to 7.5 when the reaction is complete, mechanically separating the aqueous layer from the resin, dissolving the resin in a hydrocarbon solvent, separating alkali metal formate from the resultant resin solution and removing the hydrocarbon solvent from the resin.

11. A process of producing resins comprising reacting formaldehyde with cyclohexanones of the group consisting of cyclohexanone and its 3-methyl and 4-methyl homologs in a molar ratio of from 1.35 to 1.65 mols of formaldehyde in aqueous solution to each mol of the cyclohexanone in the presence of from .25 to 1 per cent of caustic alkali catalyst based on the weight of the cyclohexanone, gradually and substantially continuously adding at least 50 per cent of the catalyst and 50 per cent of the formaldehyde simultaneously to the cyclohexanone, in a manner such that the simultaneous addition of at least about the said proportions of formaldehyde and catalyst is the final addition of reactants to the reaction mixture, raising the temperature of the reaction mixture from within the range of 50° to 70° C. to within the range of 95° to 100° C. during the reaction and controlling the pH value of the reaction mixture so that it is within the range of 8 to 9 during the initial major portion of the reaction and within the range of 6.5 to 7.5 when said reaction is complete, mechanically separating the aqueous layer, dissolving the resin in a hydrocarbon solvent, filtering the resultant resin solutions to separate alkali metal formate crystals therefrom and distilling the filtered resin solution under vacuum at a temperature not above 140° C. to remove the solvent from the resin.

12. A process of producing resins comprising reacting formaldehyde with cyclohexanones of the group consisting of cyclohexanone and its 3-methyl and 4-methyl homologs in a molar ratio of from 1.35 to 1.65 mols of formaldehyde in aqueous solution to each mol of the cyclohexanone in the presence of from .25 to 1 per cent of caustic alkali catalyst based on the weight of the cyclohexanone, gradually and substantially continuously adding at least 50 per cent of the catalyst and 50 per cent of the formaldehyde simultaneously to the cyclohexanone, in a manner such that the simultaneous addition of at least about the said proportions of formaldehyde and catalyst is the final addition of reactants to the reaction mixture, raising the temperature of the reaction mixture from within the range of 50° to 70° C. to within the range of 95° to 100° C. during the reaction and controlling the pH value of the reaction mixture so that it is within the range of 8 to 9 during the initial major portion of the reaction and within the range of 6.5 to 7.5 when said reaction is complete, mechanically separating the aqueous layer, dissolving the resin in a hydrocarbon solvent removing residual water, and distilling the resin solution under vacuum at a temperature not above 140° C. to remove the solvent from the resin.

DEE ALTON HURST.
WILLIAM J. MILLER, Jr.

REFERENCES CITED

The following references are of record in the file of this patent:

UNITED STATES PATENTS

| Number | Name | Date |
| --- | --- | --- |
| 2,059,943 | Graves | Nov. 3, 1936 |
| 2,191,802 | Novotny et al. | Feb. 27, 1940 |